(12) United States Patent
Hempert et al.

(10) Patent No.: US 11,936,177 B2
(45) Date of Patent: Mar. 19, 2024

(54) METHOD FOR LIMITING A LOAD CURRENT

(71) Applicant: Robert Bosch GmbH, Stuttgart (DE)

(72) Inventors: Fabian Hempert, Novi, MI (US); Helmut Suelzle, Pleidelsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 15 days.

(21) Appl. No.: 17/595,522

(22) PCT Filed: May 27, 2020

(86) PCT No.: PCT/EP2020/064705
§ 371 (c)(1),
(2) Date: Nov. 18, 2021

(87) PCT Pub. No.: WO2020/249397
PCT Pub. Date: Dec. 17, 2020

(65) Prior Publication Data
US 2022/0247168 A1    Aug. 4, 2022

(30) Foreign Application Priority Data
Jun. 8, 2019   (DE) ..................... 10 2019 208 410.9

(51) Int. Cl.
*H02H 9/02* (2006.01)
*H02H 3/08* (2006.01)

(52) U.S. Cl.
CPC ............... *H02H 9/02* (2013.01); *H02H 3/08* (2013.01); *H02H 9/025* (2013.01)

(58) Field of Classification Search
CPC .. H02H 3/08; H02H 9/02; H02H 3/243; H02J 2310/40; H02J 1/14
(Continued)

(56) References Cited

U.S. PATENT DOCUMENTS

| 2007/0014056 A1 | 1/2007 | Andersen et al. |
| 2013/0063850 A1* | 3/2013 | Kawamoto ............... H02H 3/08 |
| | | 361/87 |

(Continued)

FOREIGN PATENT DOCUMENTS

| DE | 102015223151 A1 | 5/2017 |
| DE | 102017202103 B3 | 3/2018 |

(Continued)

OTHER PUBLICATIONS

International Search Report for PCT/EP2020/064705, dated Jul. 29, 2020.

*Primary Examiner* — Danny Nguyen
(74) *Attorney, Agent, or Firm* — NORTON ROSE FULBRIGHT US LLP; Gerard A. Messina

(57) ABSTRACT

A method is provided for limiting a load current in a supply line that supplies a first load with electrical current. The method includes: defining a first time interval and a second time interval, the first time interval beginning after a time of connection of the first load to the supply line, and the second time interval beginning later than the first time interval; limiting the load current within the first and second time interval to a first value; limiting the load current, at least at the end of the second time interval, to a second value, the second value being smaller than the first value.

11 Claims, 3 Drawing Sheets

(58) Field of Classification Search
USPC .................................. 361/86–87, 93.7–93.9
See application file for complete search history.

(56) References Cited

U.S. PATENT DOCUMENTS

2018/0226786 A1\*  8/2018  Fischer .............. H03K 17/0822
2018/0342963 A1   11/2018  Morschel et al.

FOREIGN PATENT DOCUMENTS

EP         2822127  A2    1/2015
JP       2008100660  A    5/2008

\* cited by examiner

METHOD FOR LIMITING A LOAD CURRENT

FIELD

The present invention relates to a method for limiting a load current in a supply line that supplies a first load with electrical current.

BACKGROUND INFORMATION

In an onboard vehicle electrical network, there are electrical resistances due to, for example, electrical lines or contacts. When a current flows through such resistances, there is a voltage drop over the resistances, and the terminal voltage available to a consumer, i.e., to a load, decreases. As the current through these resistances increases, the voltage drop at these resistances also increases. Due to the required power and the relatively low voltage in an onboard network, very high currents flow, so that this effect becomes significant for the functioning of connected electrical loads such as electrical devices. If, due to the voltage drop over at least parts of the supply line, a too-low voltage is present at the terminal connections of such devices, it may occur that all the functions can no longer be maintained, or a resulting performance level is limited. Depending on the type of device and program scenarios, the performance of such a device, such as an electrically actuated brake, is then either reduced, or a transition is made to a fallback level, in the form of a deactivation of such a device, with a corresponding warning, or a transition to a fallback solution using a redundant system.

SUMMARY

In order to limit such a voltage dip due to resistances in a supply line, systems are designed that have a current limiting that, in such a case, reduce the current consumption of the consumer as a direct function of the voltage. In this way, in some cases a transition to a fallback level of the load itself, or of a second device supplied with current by the same line, can be prevented. However, this then causes reduced performance of such a device.

The present invention provides a method for limiting a load current in a supply line, as well as a device, a computer program, and a machine-readable storage medium. Advantageous embodiments of the present invention are disclosed herein.

The present invention is based on the recognition that for a use of an overall system, it can be more advantageous to provide a current limiting that is designed such that additional functions of an overall system provided by secondarily connected devices are maintained, even if performance losses of primary devices result therefrom.

For example, the permanent maintenance of an anti-lock brake system (ABS) during braking may be more important than a maximum braking power, because under normal conditions the brake already locks at 40% of the braking power.

Corresponding to an aspect of the present invention, a method is provided for limiting a load current in a supply line, the supply line supplying a first load with electrical current. In accordance with an example embodiment of the present invention, in a step of the method, a first time interval and a second time interval are defined, the first time interval beginning after a time of connection of the first load to the supply line, and the second time interval beginning later than the first time interval.

In a further step, the load current is limited within the first and second time interval to a first maximum value.

In a further step, the load current, at least at the end of the second time interval, is limited to a second maximum value, the second maximum value being smaller than the first maximum value.

In this overall description of the present invention, the sequence of method steps is presented in such a way that the method is easily understandable. However, the person skilled in the art will recognize that many of the method steps can also be run through in a different sequence while leading to the same result, or to a corresponding result. In this sense, the sequence of the method steps can be correspondingly modified.

An advantage of the limiting of the load current to a first value within the first and second time interval after the connection of the first load, which is then connected to the supply line, is that a voltage drop over at least parts of the electrical supply line can be limited. Due to resistances in the supply line of the electrical energy to the first load, a voltage drop caused by the occurring current may occur both within the supply line itself and also at contact points. If this current is limited, a terminal voltage at the first load, and at additional loads, can be prevented from falling below a resulting voltage value. This is because the voltage drop at resistances of the electrical supply line has to be subtracted from a supply voltage, for example from an electrical power source, and is then no longer available for the (for example) first load in the form of the terminal voltage.

In this way it can be achieved that a minimum terminal voltage that the first load requires in order to provide at least a basic functionality is not fallen below due to this limiting of the load current. Here, this first load can also be understood as a system that has a plurality of loads. This can be particularly relevant for example for a brake system of the vehicle that is electrically operated, because typically brake systems are designed such that a fraction of their potential performance is already sufficient to apply the full braking power under normal conditions. This can mean that for example the braked wheels lock at this fraction of the performance level.

Due to the fact that the terminal voltage does not fall below a minimum level with a limiting of the load current, further devices that are also supplied with electrical energy by the supply line can also be provided with a minimum terminal voltage that ensures their functionality.

Through the limiting of the load current at least at the end of the second time interval to a second value that is smaller than the first value, it can be achieved that, in a second time period after the connection of the load to the supply line, the load current is further limited in order to provide a terminal voltage at the first load that is higher than the above-named minimum terminal voltage. This can be advantageous in particular if further devices that are also supplied with electrical energy by the supply line require a terminal voltage higher than the minimum terminal voltage in order to be able to provide their functionality over a certain span of time.

Thus, a maximum load current that may be required at the level of the first value for a first time interval can be provided for example for the first load, such that in this first time interval a further device, as secondary load, continues to maintain its functionality and, through an additional limiting of the load current in the second time interval, it is ensured that the additional device maintains its functionality even if this is done at the cost of the performance of the first load in the second time interval. This is because due to the current limiting to a lower value the first load can also take only a smaller load current from the supply lines.

According to an example embodiment of the method of the present invention, it is provided that the second time interval follow the first time interval immediately.

Between the first and the second time interval, it is also possible to provide a time interval in which the limiting to the first value goes over into the limiting to the second value. Depending on the design of the system for the limiting to the first, or second, value, a corresponding switchover time may be required.

Likewise, a further time interval may be provided after the time of connection of the first load and the beginning of the first time interval.

According to a further embodiment of the method of the present invention, it is provided that the first value for the load current be determined using a load current characteristic curve, as a function of a terminal voltage of the first load.

Using such a load current characteristic curve, which defines a relation between the load current and a terminal voltage at the first load, it can be ensured that the load current is limited enough that a resulting voltage at the electrical terminal of the first load does not fall below a minimum value.

With such a safety measure, it is ensured that, because the corresponding minimum voltage is maintained, at least other devices also connected to the vehicle electrical network maintain their functionality through, for example, a malfunction of a first load that would pull the entire vehicle electrical network to a too-low voltage.

According to a further embodiment of the method of the present invention, it is provided that the terminal voltage for the load current characteristic curve be determined in the first and/or second time interval.

If the limiting of the load current to the first value is also continued in the second time interval, then the terminal voltage also has to be determined in the second time interval, and if the limiting takes place in the second time interval to the second value, which is lower than the first value, then through the limiting of the load current to the first value in the second time interval a fallback solution for the limiting of the load current is may be achieved that increases the safety of the overall system.

According to a further embodiment of the method of the present invention, it is provided that the terminal voltage also be determined outside the first and second time interval. In this way, it is achieved that even before a connection of the first load to the supply line, the voltage values of the terminal voltage of the first load are provided in order to make it possible to achieve a limiting of the load current within a shorter time span after the connection of the first load to the supply line.

According to a further embodiment of the method of the present invention, it is provided that the first value for the load current be limited through a controlling of the level of the value of the load current, as a function of a terminal voltage at the first load or at a second load.

According to a further embodiment of the method of the present invention, it is provided that the second value for the load current be determined by a resistance value at least of parts of the supply line.

Such a resistance value at least of parts of the supply line can be ascertained in an independent resistance measurement. Such a resistance can result from the resistance of the supply line itself, because over the operating time of a vehicle this value can increase, for example due to corrosion. In addition, such a resistance results from transition resistances, above all things at contacts, and such transition resistances can increase within the operating time for example due to corrosion.

The resistance of such a supply line is here understood, unless explicitly described otherwise, in the sense that all resistances that the terminal voltage at the end of the supply line to which a load is connected is combined in one value. This thus also includes contact resistances and ground connections.

If such a resistance value of the supply line is known, for example from a preceding measurement, then it can be ascertained, according to Ohm's law, what the maximum magnitude of the current can be in order to ensure a corresponding minimum terminal voltage at the first load.

Because further devices or loads also connected to the supply line can also maintain their functionality, for example for a time span that includes the first time interval and the second time interval, through the fact that the current is correspondingly limited at the end of the second time interval it is achieved that a minimum terminal voltage is ensured that is necessary for such a device to continuously maintain its functionality.

For example, the first time interval can be selected to be very short, or this value can also determine, for the first time interval, the value of the load current to which the current is limited in the first time interval.

According to a further embodiment of the method of the present invention, it is provided that the resistance value of at least parts of the supply line be determined independently of the method for limiting the load current.

This is achieved for example by limiting the load current in the first time interval, i.e. immediately after the connection for example of the first load to the supply line, to the ascertained first value for the load current.

According to an embodiment of the method of the present invention, it is provided that the load current in the first and second time interval be limited to the second value for the load current, this second value being determined using the above-described resistance value of at least parts of the supply line.

In this way, it is achieved that a certain resulting minimum terminal voltage is maintained both in the first time interval and in the second time interval.

According to an embodiment of the method of the present invention, it is provided that the load current be limited at the beginning of the second time interval to the first value, and that within the second time interval it be limited to the second value using a predefined curve of the load current.

Such a curve can be controlled to be more linear, more progressive, degressive, monotonically falling, or to switch, i.e., with a jump in the curve.

Thus, in the second time interval as well a higher load current is provided, which makes it possible for example within this second time interval to output a higher power to the first load. For an electrically operated brake system, this can mean that a brake power within the second time interval is higher than after the end of the second time interval.

According to a further embodiment of the method of the present invention, it is provided that the load current be limited within the second time interval corresponding to a control method having a specified target voltage curve and corresponding to terminal voltages measured at the first load in the first and/or second time interval.

In this example embodiment, the knowledge of the resistance value to which a part of the voltage can fall as a function of the load current, thus providing a reduced terminal voltage, is not required. Through the determination of the voltage, such as for example the terminal voltage at the first load, compared to the target voltage or to a target voltage curve, the value to which the second value of the load current is to be limited can be ascertained for example using a control circuit. The target voltage curve to be specified can therefore be adapted very narrowly to the possible target voltage in the various time windows, and thus for example for the first load the maximum possible current can be made available, which can take into account a current state of the vehicle electrical network, based on the current voltage measurement. Such a target voltage curve can specify, at the end of second time interval T3, a target voltage having level U2, in order to enable the further operation of a second load as described above.

In this way, on the one hand it is achieved that the determination ahead of time of the resistance value of the supply line is not required, and the load current actually has to be limited, with respect to its magnitude and the available second time interval, only to the extent required to ensure a minimum terminal voltage, the target voltage.

In this way, it is achieved that in the second time interval the maximum load current for the first load can be provided, under the specified boundary conditions of a required terminal voltage.

Through this limitation of the load current in the second time interval, a further device, or a second load, that temporarily requires a first terminal voltage, or permanently requires a second terminal voltage that is higher than the first terminal voltage, can be continuously operated. Nonetheless, for the first load, in the second time interval as well a load current is provided that enables a higher performance level.

In addition, given a known supply line resistance, this can be taken into account in the determination of the second value for the load current as a function of a terminal voltage in order to optimize a control method for the limiting of the load current as a function of the terminal voltage compared to the target voltage.

According to a further embodiment of the method of the present invention, it is provided that within a start time interval that lies before the first time interval, or between the first and the second time interval, no limiting of the load current takes place. Within this start time interval, for example a voltage measurement can take place, or a dead time of an electronic circuit for limiting the load current can be situated therein.

According to a further embodiment of the method of the present invention, it is provided that parameters of the voltage controlling relating to the speed of controlling be determined using a first measured voltage value and the target voltage value and the specified second time interval.

In this way, it is achieved that the determination of the second value of the load current can be optimally adapted as a function of measured voltages of the particular system. Here, a resistance value that may be known of the supply line can also be taken into account.

According to a further embodiment of the method of the present invention, it is provided that the supply line provides electrical current to a first load and to a second load, and the second value of the load current is determined as a function of a minimum terminal voltage of the second load.

By taking into account the minimum terminal voltage of the second load, the second load can be operated at least after the end of the second time interval.

If the first load requires a lower minimum voltage for a basic functionality than does the second load, then after the end of the second time interval the second load can be further operated. Here the second load can be designed such that within the first or second time interval the functionality of the second load is present for this limited time.

After a predefined time, and as a function of a voltage provided at a second load, the second load can be set up to halt the functionality, and to be set into operation again only via a reset process that requires a time duration that may not be tolerable. This time duration, or this provided voltage at the first or at the second load, at which a halting of the functionality takes place may be different for the first or for the second load. The first time interval and/or the second time interval can be defined as a function of a time span in which the second load remains capable of functioning below the second terminal voltage, or a time period at whose expiration no reset process has to be triggered.

According to a further embodiment of the method of the present invention, it is provided that a control signal for controlling an at least partly automated vehicle, and/or a warning signal for warning a vehicle occupant, is sent out when the level of the load current reaches the first and/or second value of the load current.

According to a further embodiment of the method of the present invention, it is provided that a control signal for controlling an at least partly automated vehicle, and/or a warning signal for warning a vehicle occupant, is sent out when the level of the load current reaches or exceeds the first and/or second value of the load current for a specified time duration. Here, this specified time duration also includes the smallest possible time interval in which an individual exceeding of the current lies.

Because the reaching of the level of the load current corresponding to the first and/or second value means that, if appropriate, the functionality of the first and/or of the second load is at least partly limited, in an at least partly automated vehicle this can have the result that certain driving maneuvers can no longer be carried out, or the driver has to take over the driving of the vehicle him- or herself. If, due to a short duration of the limited functionality, the full functionality is then subsequently again available, a warning issued to a vehicle driver may be sufficient.

In accordance with an example embodiment of the present invention, a device is provided that is set up to carry out a method as described above. Using such a device, the method can be quickly and easily integrated into various larger units. Such a larger unit may be an at least partly automated vehicle, or also a driver assistance system used in a vehicle.

The described method for limiting a load current in a supply line can be used in many applications, in particular in all applications in which an electrohydraulic brake system is used. In this context, a vehicle is to be generally understood as an automobile, including an at least partly automated vehicle or a vehicle having a driver assistance system, as well as in particular motorcycles, construction machines, agricultural vehicles, and others. However, it also includes in general mobile platforms, mobile multisensor robots, such as robot vacuum cleaners or lawnmowers, a mobile multisensor monitoring system, a manufacturing machine, a personal assistant, or an access control system. In addition, the method can also generally be used in machines that are not mobile that for example have electrohydraulic brake systems.

In accordance with an example embodiment of the present invention, a computer program is provided that includes commands that, when the program is executed by a computer, cause this computer to carry out the method described above. With such a computer program, the method can easily be integrated into various systems.

In accordance with an example embodiment of the present invention, a machine-readable storage medium is provided on which the computer program product described above is stored. With such a machine-readable storage medium, the above-described computer program can easily be transported.

BRIEF DESCRIPTION OF THE DRAWINGS

Exemplary embodiments of the present invention are shown with reference to FIGS. 1 to 3, and are explained in more detail below.

DETAILED DESCRIPTION OF EXAMPLE EMBODIMENTS

Figure 1:
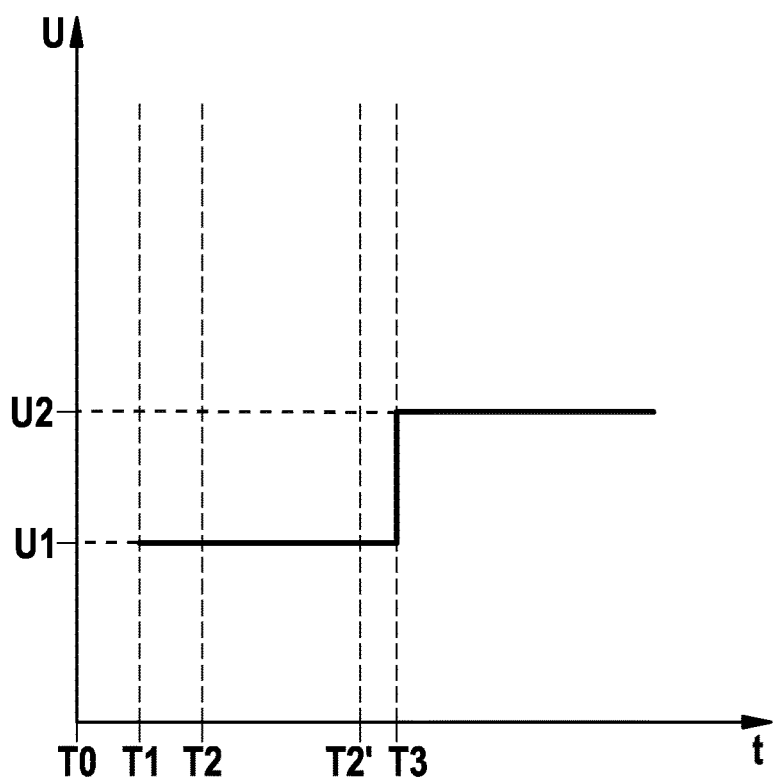
FIG. 1 shows target voltages and time intervals of the method in accordance with an example embodiment of the present invention.

In FIG. 1, examples of target voltages in various time intervals after the connection of a load to a supply line are shown. At time T0, the first load is connected to the supply line, which can be followed by a start time interval until T1, in which, if warranted, no current limiting, or a current limiting not shown here, takes place. Here, the start time interval may also be completely omitted.

The first time interval begins at time T1 and can end for example at time T2. In FIG. 1, the second time interval immediately follows the first time interval, and the second time interval ends at time T3. A time interval between T2' and T3 can be provided as a safety margin for balancing processes or for a time interval in which the terminal voltage is controlled from U1 to U2, based on a controlling of the current as a function of the terminal voltage.

First target voltage U1 is smaller than second target voltage U2, and extends from T1 to T3. Second target voltage U2 begins at time T3. These voltages and time intervals can be given on the basis of technical specifications or requirements of for example a machine that is connected to the supply line, in a manner corresponding to the first load, as second load, and thus has the same supply line.

In a first exemplary embodiment, the terminal voltage of the first load is held, for a limited time interval between T1 and T3, below second target voltage U2 and above first target voltage U1. For this purpose, the load current of the supply line that supplies the first load with electrical current is limited.

A first time interval from T1 to T2 and a second time interval from T2 to T3 are defined (S1), the first time interval beginning immediately after a connection time T1 of the first load to the supply line. Alternatively, between the connection time of the load and the beginning of the first time interval at T1, a defined start interval can also lie between T0 and T1. Here, the second time interval begins later, at time T2, than does the first time interval, at time T1. In FIG. 1, at time T2 the second time interval immediately follows the first time interval.

Figure 2:
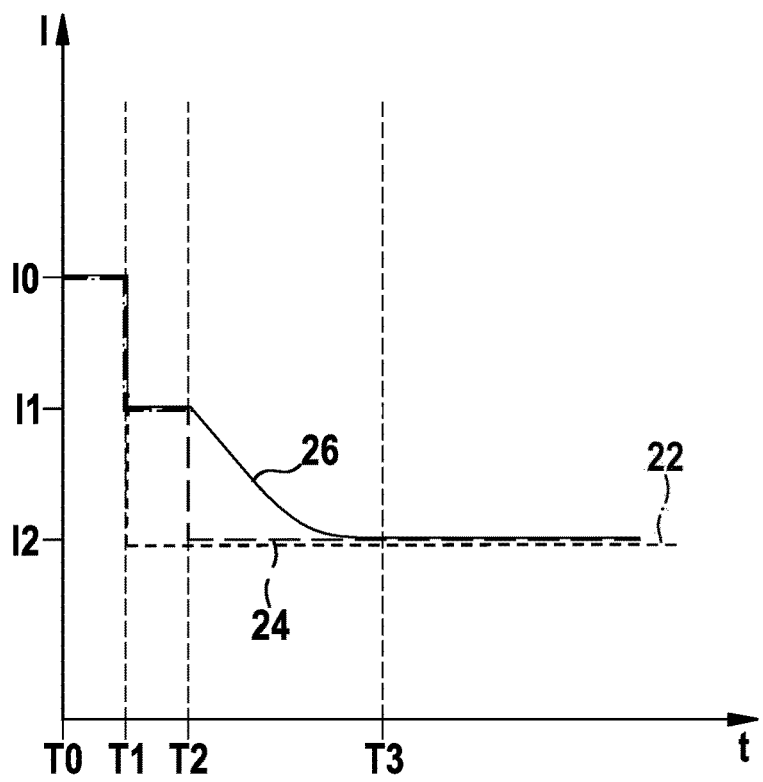
FIG. 2 shows examples of the limited load current curve in the time intervals of the method, in accordance with the present invention.

FIG. 2 shows a curve of load current 24, limited in accordance with the method, within the first time interval and the second time interval, of for example a value of load current I0, before the connection of the load to the supply line, limited to a first value I1 (S2). Here, first value I1 is determined for the load current by a load current characteristic curve 30 (FIG. 3) as a function of a terminal voltage of the first load.

Figure 3:
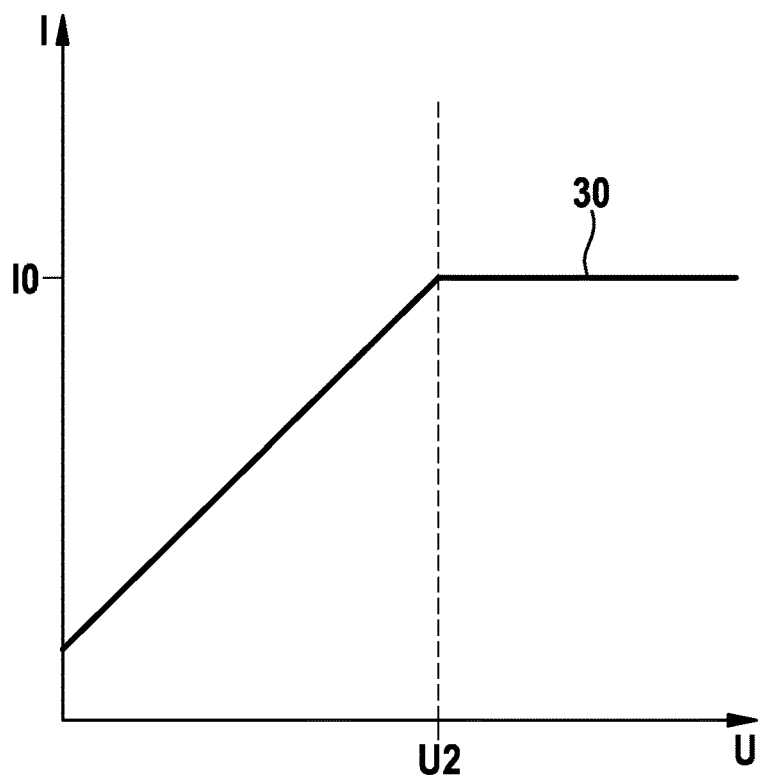
FIG. 3 shows an exemplary curve of a load current characteristic curve.

FIG. 3 shows an example of a load current characteristic curve for ascertaining the necessary current limiting as a function of a terminal voltage U of the first load. As long as terminal voltage U of the first load is greater than a second target voltage U2, the maximum current I0 can be provided by the supply line. As soon as a measurement of terminal voltage U ascertains that second target voltage U2 has been fallen below, the load current is reduced, corresponding to characteristic curve 30, for example to a first value I1 of the load current in order to ensure a terminal voltage U at the first load that is at the level of the first target voltage U1.

The load current in the supply line of the first load is limited (S3) within the second time interval in such a way that at least at the end of second time interval T3 the load current is not higher than second current I2, second current I2 being smaller than first value I1 of the load current.

Figure 4:
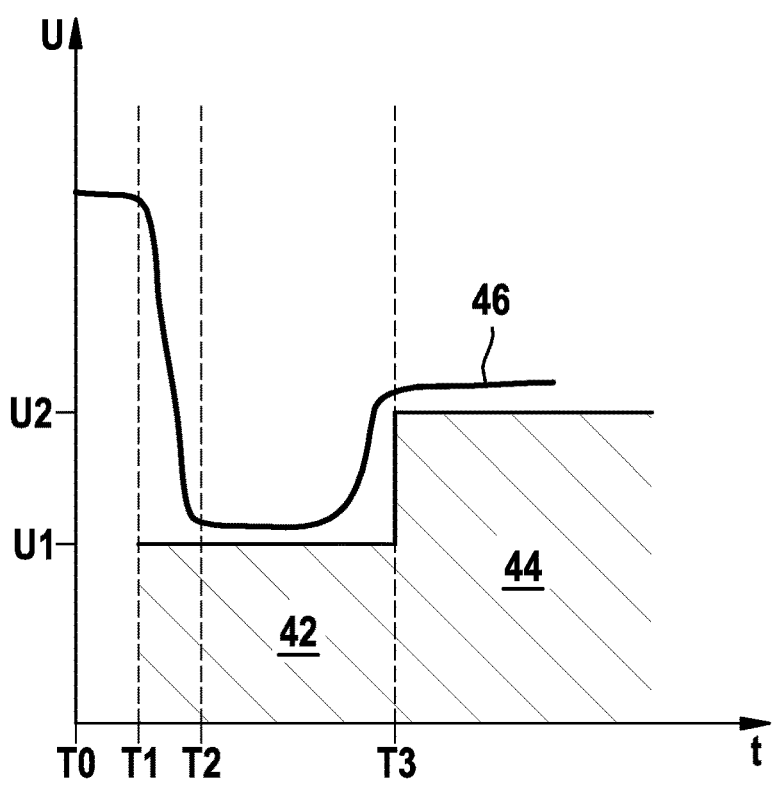
FIG. 4 shows an exemplary curve of a terminal voltage in the time intervals.

According to an exemplary embodiment, terminal voltage U is determined in the first and/or time interval, and second value I2 of the load current is determined by a resistance value of at least parts of the supply line. This resistance value of at least parts of the supply line can be determined in a method independent of the limiting of the load current. Here, second current I2 is calculated from the determined or measured terminal voltage having this resistance value according to Ohm's law. A possible curve of the terminal voltage due to the further limiting of the load current from first value I1 to second value I2 can cause a terminal voltage curve 46, as shown in FIG. 4. Here, the terminal voltage runs in such a way that voltage time regions 42, 44, which would for example cause a device to switch off, are avoided. From this there results a terminal voltage U of the first load for time periods that lie after the second time interval that is greater than the value U2, and thus further devices also electrically connected to the supply line can be continuously operated, as described above.

Corresponding to a further exemplary embodiment, in the first and second time interval the load current is limited to the second value I2 thus ascertained, as is shown in FIG. 2 by curve 22 of the load current of the supply line.

Corresponding to a further exemplary embodiment, at the beginning of second time interval T2 the load current can be limited to first value I1 of the load current, and within the second time interval can be guided to the second value I2 at the end of second time interval T3, according to a predefined curve of the limiting of the load current. In FIG. 2, this is shown by curve 24 and 26 of the load current in the first and second time interval; in curve 26, as an example a predominantly linear curve has been selected in the second time interval. The curve of the load current in the second time interval can however have a different shape, as shown for example by the jump in curve 24 at time T2.

Figure 5:
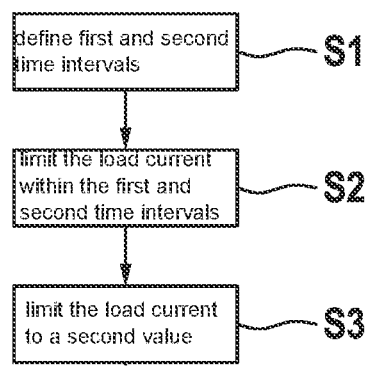
FIG. 5 shows method steps for limiting the load current, in accordance with an example embodiment of the present invention.

Corresponding to a further exemplary embodiment, within the second time interval the load current is limited to second value I2 and second value I2 is not calculated, as above, by a resistance measurement, but rather is determined according to a control method in the second time interval with a specified target voltage, such as the first target voltage U1, and a terminal voltage U at the first load, measured in the first and/or second time interval. For this purpose, terminal voltage U is repeatedly measured at least within the second time interval in order to limit, in accordance with a control method, the load current to a corresponding value in such a way that within the second time interval the terminal voltage U at the first load is greater than the second target voltage U1, and at the end of the second time interval the load current is limited to the second value I2 in such a way that the terminal voltage U at the first load is greater than the second target voltage U2. FIG. 5 shows method steps S1 to S3 described above.

What is claimed is:

1. A method for limiting a load current in a supply line that supplies a first load with electrical current, the method comprising the following steps:
    defining a first time interval and a second time interval, the first time interval beginning after a time of connection of the first load to the supply line, and the second time interval beginning later than the first time interval;
    limiting the load current within the first time interval and second time interval to a first value; and
    limiting the load current, at least at an end of the second time interval, to a second value, the second value being smaller than the first value, wherein the first value for the load current is determined, using a load current characteristic curve, as a function of a terminal voltage of the first load, and wherein the second value for the load current is determined by a resistance value at least of parts of the supply line.

2. The method as recited in claim 1, wherein the terminal voltage is determined in the first time interval and/or the second time interval.

3. The method as recited in claim 1, wherein the load current is limited, in the first and second time interval, to the second value.

4. The method as recited in claim 1, wherein the load current is limited at a beginning of the second time interval to the first value and being limited within the second time interval, using a predefined curve, to the second value.

5. The method as recited in claim 1, the load current being limited, within the second time interval, corresponding to a control method with a specified target voltage curve and terminal voltages measured in the first and/or second time interval at the first load.

6. The method as recited in claim 1, wherein the supply line supplies the first load and a second load with electrical current, and the second value of the load current is determined as a function of a terminal voltage of the second load.

7. The method as recited in claim 1, wherein a control signal for controlling an at least partly automated vehicle and/or a warning signal for warning a vehicle occupant is issued when a level of the load current reaches the first value and/or the second value of the load current.

8. A device configured to limit a load current in a supply line that supplies a first load with electrical current, the device configured to:
    define a first time interval and a second time interval, the first time interval beginning after a time of connection of the first load to the supply line, and the second time interval beginning later than the first time interval;
    limit the load current within the first time interval and second time interval to a first value; and
    limit the load current, at least at an end of the second time interval, to a second value, the second value being smaller than the first value, wherein the first value for the load current is determined, using a load current characteristic curve, as a function of a terminal voltage of the first load, and wherein the second value for the load current is determined by a resistance value at least of parts of the supply line.

9. A non-transitory machine-readable storage medium on which is stored a computer program for limiting a load current in a supply line that supplies a first load with electrical current, the computer program, when executed by a computer, causing the computer to perform the following steps:
    defining a first time interval and a second time interval, the first time interval beginning after a time of connection of the first load to the supply line, and the second time interval beginning later than the first time interval;
    limiting the load current within the first time interval and second time interval to a first value; and
    limiting the load current, at least at an end of the second time interval, to a second value, the second value being smaller than the first value, wherein the first value for the load current is determined, using a load current characteristic curve, as a function of a terminal voltage of the first load, and wherein the second value for the load current is determined by a resistance value at least of parts of the supply line.

10. A method for limiting a load current in a supply line that supplies a first load with electrical current, the method comprising the following steps:
    defining a first time interval and a second time interval, the first time interval beginning after a time of connection of the first load to the supply line, and the second time interval beginning later than the first time interval;
    limiting the load current within the first time interval and second time interval to a first value; and
    limiting the load current, at least at an end of the second time interval, to a second value, the second value being smaller than the first value, wherein the supply line supplies the first load and a second load with electrical current, and the second value of the load current is determined as a function of a terminal voltage of the second load.

11. A method for limiting a load current in a supply line that supplies a first load with electrical current, the method comprising the following steps:
    defining a first time interval and a second time interval, the first time interval beginning after a time of connection of the first load to the supply line, and the second time interval beginning later than the first time interval;
    limiting the load current within the first time interval and second time interval to a first value; and
    limiting the load current, at least at an end of the second time interval, to a second value, the second value being smaller than the first value, wherein a control signal for controlling an at least partly automated vehicle and/or a warning signal for warning a vehicle occupant is issued when a level of the load current reaches the first value and/or the second value of the load current.

* * * * *